US006785101B2

(12) United States Patent
Webb et al.

(10) Patent No.: US 6,785,101 B2
(45) Date of Patent: Aug. 31, 2004

(54) OVERLAID LEAD GIANT MAGNETORESISTIVE HEAD WITH SIDE READING REDUCTION

(75) Inventors: Patrick Rush Webb, San Jose, CA (US); Mustafa Pinarbasi, Morgan Hill, CA (US); Richard Hsiao, San Jose, CA (US); Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 371 days.

(21) Appl. No.: 09/905,522

(22) Filed: Jul. 12, 2001

(65) Prior Publication Data

US 2003/0011943 A1 Jan. 16, 2003

(51) Int. Cl.[7] ................................................. G11B 5/33
(52) U.S. Cl. ..................................................... 360/324.1
(58) Field of Search ........................ 360/324.1, 324.11, 360/324.12, 324.2, 322

(56) References Cited

U.S. PATENT DOCUMENTS

| 5,206,590 A | 4/1993 | Dieny et al. ................. 324/252 |
| 5,508,866 A | 4/1996 | Gill et al. .................... 360/113 |
| 5,600,518 A | 2/1997 | Koga .......................... 360/113 |
| 5,633,771 A | 5/1997 | Yoda et al. .................. 360/121 |
| 5,634,260 A | 6/1997 | Nix et al. ................... 29/603.14 |
| 5,664,316 A | 9/1997 | Chen et al. ............... 29/603.08 |
| 5,737,155 A | 4/1998 | George et al. .............. 360/113 |
| 5,753,131 A | 5/1998 | Choukh et al. ................ 216/22 |
| 5,764,445 A | 6/1998 | Torng et al. ................. 360/113 |
| 5,774,309 A | 6/1998 | Uno et al. ................... 360/113 |
| 5,867,889 A | 2/1999 | Dovek et al. ............. 29/603.13 |
| 5,896,251 A | 4/1999 | Ohsawa et al. ............. 360/113 |
| 5,901,222 A | 5/1999 | Macor ......................... 379/433 |
| 5,926,348 A | 7/1999 | Shouji et al. ............... 360/113 |
| 5,930,084 A | 7/1999 | Dovek et al. ............... 360/113 |
| 5,943,763 A | 8/1999 | Shouji et al. ............. 29/603.14 |
| 5,949,623 A | 9/1999 | Lin ............................. 360/113 |
| 5,992,507 A | 11/1999 | Peterson et al. .............. 165/45 |
| 5,999,379 A | 12/1999 | Hsiao et al. ................. 360/113 |
| 6,030,753 A | 2/2000 | Lin ............................. 430/314 |
| 6,643,107 B1 * | 11/2003 | Hasegawa et al. ....... 360/324.1 |

OTHER PUBLICATIONS

*Journal Magnetics Society*, Japan, vol. 21, pp 261–264, 1997, "Numerical Analysis of Spin–Valve Heads with Overlapping Leads".

*Intermag*, 1999, Cat. 5, No. 59, "Read–Write Performance of GMR Heads With Lead Overlaid Structure".

* cited by examiner

*Primary Examiner*—George J. Letscher
*Assistant Examiner*—Mark S Blouin
(74) *Attorney, Agent, or Firm*—Ervin F. Johnston

(57) ABSTRACT

The first and second side surfaces of either a bottom spin valve sensor or a top spin valve sensor are notched so as to enable a reduction in the magnetoresistive coefficient of side portions of the sensor beyond the track width region thereby minimizing side reading by the sensor. The first and second notches of the spin valve sensor are then filled with layers in various embodiments of the invention to complete the spin valve sensor.

17 Claims, 17 Drawing Sheets

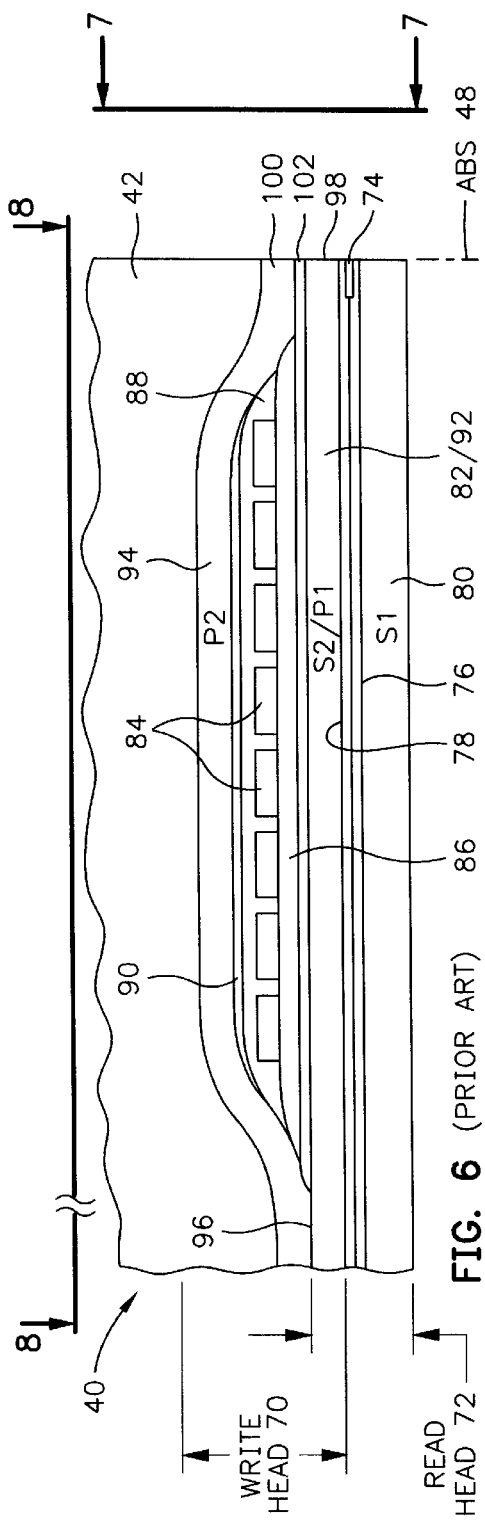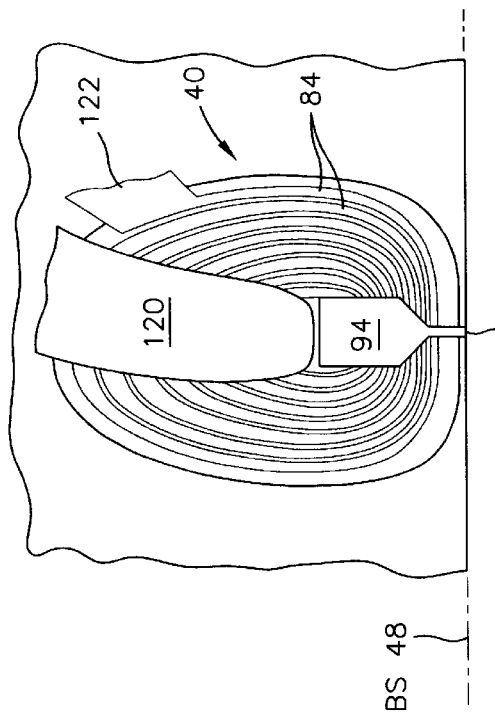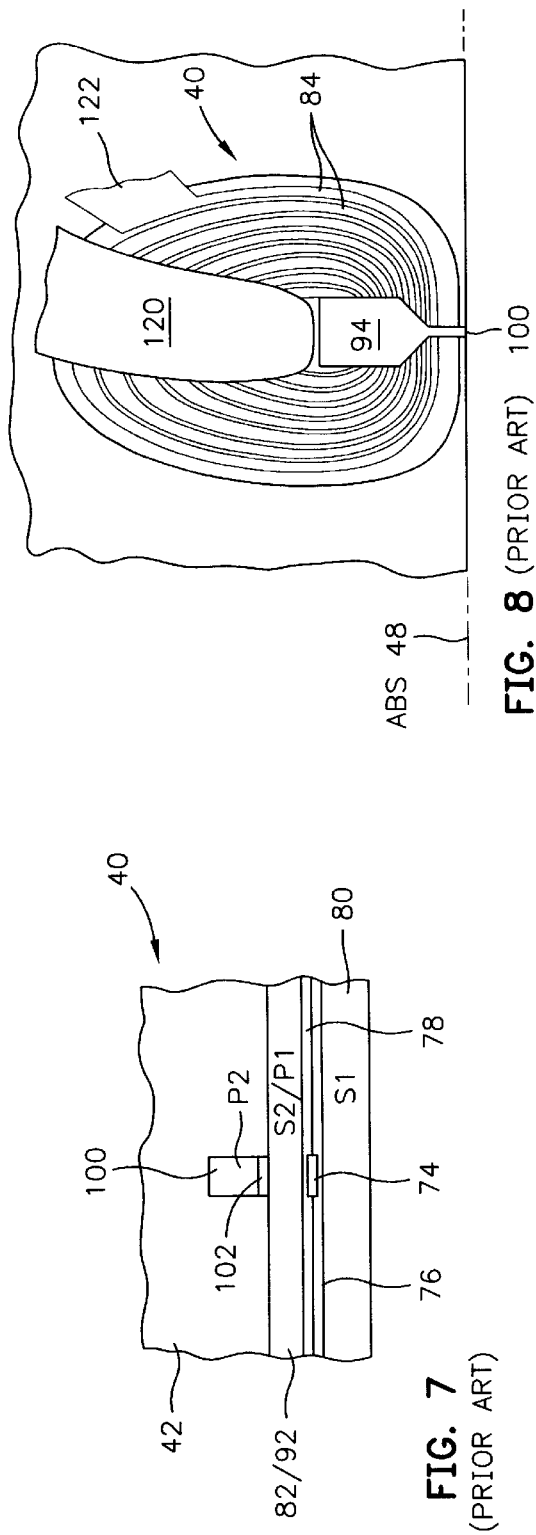

OVERLAID LEAD GIANT MAGNETORESISTIVE HEAD WITH SIDE READING REDUCTION

BACKGROUND OF THE INVENTION

1. Field of the Invention

The present invention relates to an overlaid lead giant magnetoresistive head with side reading reduction and, more particularly, to such a head wherein first and second side surfaces of a spin valve sensor are notched and replaced with refill layers for minimizing a magnetoresistive coefficient of the spin valve sensor in side regions beyond a track width of the read head.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance giant magnetoresistive (GMR) read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or zero bias point position in response to positive and negative magnetic field signals from a rotating magnetic disk. The quiescent position, which is parallel to the ABS, is the position of the magnetic moment of the free layer structure when the sense current is conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the GMR read head includes nonmagnetic electrically nonconductive first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel respectively. Spin valve sensors are still further classified as single or dual wherein a single spin valve sensor employs only one pinned layer and a dual spin valve sensor employs two pinned layers with the free layer structure located therebetween.

In a prior art spin valve sensor first and second hard bias and lead layers interface first and second side surfaces of the spin valve sensor wherein the first and second side surfaces intersect the ABS. This type of sensor is referred to in the art as a contiguous junction type of sensor and is fully described in U.S. Pat. No. 5,018,037. Each of the first and second hard bias layers is a strong magnet which longitudinally biases the free layer so that it is magnetically stable in a single domain state. Unfortunately, a magnetic moment in each of the first and second side portions of the free layer are pinned by the first and second hard bias layers so that they do not rotate (respond) to field signals from the rotating magnetic disk. As the sensor track width dimensions grow narrower the pinned regions, which are also referred to as dead layer regions, become a larger fraction of the sensor track width. Consequently, less of the free layer in the sensor track width region is available to read the field signal.

In order to overcome the problem with the prior art contiguous junction type of sensor the contiguous junctions of the first and second hard bias layers are moved further away from the track width region and first and second conducting leads overlap the first and second hard bias layers and first and second top portions of the sensor with the spacing between the leads defining the track width of the sensor. A problem with this design is that a small portion of the sense current will still pass through the sensor layers below the conducting leads, even though the conducting leads have a much lower resistance than the spin valve sensor layers. Unfortunately, this causes the spin valve layer portions below the first and second conducting leads to be slightly active so as to have some response to field signals from the rotating magnetic disk. Since these field signals are outside the track to be read the sensor is sensing field signals from adjacent tracks which is referred to as side reading. There is a strong-felt need to overcome this side reading problem in the continuous type (overlapping leads) spin valve sensor.

SUMMARY OF THE INVENTION

The present invention minimizes the side reading problem by notching the first and second side surfaces of the spin valve sensor and disposing first and second ferromagnetic refill layers in the notches wherein the ferromagnetic refill layers magnetically couple the first and second hard bias layers to first and second side edges of the free layer. The first and second conducting leads overlap the first and second hard bias layers and the first and second ferromagnetic refill layers. The notches in the side surfaces of the spin valve sensor are sized so as to reduce the magnetoresistive coefficient dr/R of the spin valve sensor portions below the first and second conducting leads. In a first embodiment of the invention a cap layer at the top of a bottom spin valve sensor is provided with first and second recessed side surfaces which, in turn, provide the first and second notches. The first and second ferromagnetic refill layers are disposed within the notches and interface the free layer so that the free layer is thicker in the regions below the first and second leads. The magnetoresistive coefficient dr/R is lowered with the increasing free layer thickness below the conducting leads and the thicker regions are further more resistant to demagnetization.

In a second embodiment the first and second side surfaces of each of the cap layer and the free layer are recessed to provide the first and second notches. First and second copper refill layers interface first and second top surfaces of the spacer layer and the first and second ferromagnetic refill layers overlay the first and second copper refill layers. Because of the increased thickness of the spacer layer in the regions below the first and second leads the magnetoresistive coefficient dr/R has been decreased. Because of the thinness of the first and second copper refill layers the first and second ferromagnetic refill layers are still magnetically coupled to the first and second hard bias layers for longitudinally biasing the free layer.

In a third embodiment of the invention the first and second side surfaces of the cap and free layers are recessed and a portion of the first and second side surfaces of the spacer layer are recessed to provide the first and second notches. First and second ferromagnetic refill layers are disposed in the first and second notches with the first and second ferromagnetic layers being directly magnetically coupled to the first and second hard bias layers and the free layer. With this embodiment the spacer layer has first and second thin portions below the first and second leads which causes a ferromagnetic coupling field between the pinned and free layers in these regions. This pins the magnetic moment of the free layer in these regions so that it will not respond to field signals from the rotating magnetic disk.

In a fourth embodiment of the invention the first and second side surfaces of each of the cap layer, free layer and spacer layer are recessed so as to provide the first and second notches. The first and second ferromagnetic refill layers are disposed within the first and second notches and are magnetically coupled between the first and second hard bias layers and the free layer. The first and second ferromagnetic refill layers interface first and second top surface portions of the pinned layer and effectively increase its thickness in the regions below the first and second leads. The extra thick pinned layer portions in these regions cannot effectively be pinned by the pinning layer therebelow so that the magnetoresistive coefficient dr/R is minimized.

In a fifth embodiment of the present invention first and second side surfaces of the cap layer and first and second side surfaces of the pinning layer are recessed in a top spin valve sensor so as to provide the first and second notches and the first and second conductive leads are disposed within the first and second notches and overlay the first and second hard bias layers. In this embodiment the first and second ferromagnetic refill layers are not required since the first and second hard bias layers interface the first and second side surfaces of the free layer for stabilizing the free layer. In this embodiment first and second side portions of the pinned layer are no longer pinned and the magnetoresistive coefficient dr/R of the regions of the sensor below the first and second leads is minimized.

An object of the present invention is to minimize the magnetoresistive coefficient dr/R of side regions of a continuous junction spin valve sensor which are below first and second conducting leads.

Another object is to provide an overlaid lead GMR head wherein a spin valve sensor has reduced side reading.

A further object is to provide a method of making the aforementioned spin valve sensors.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
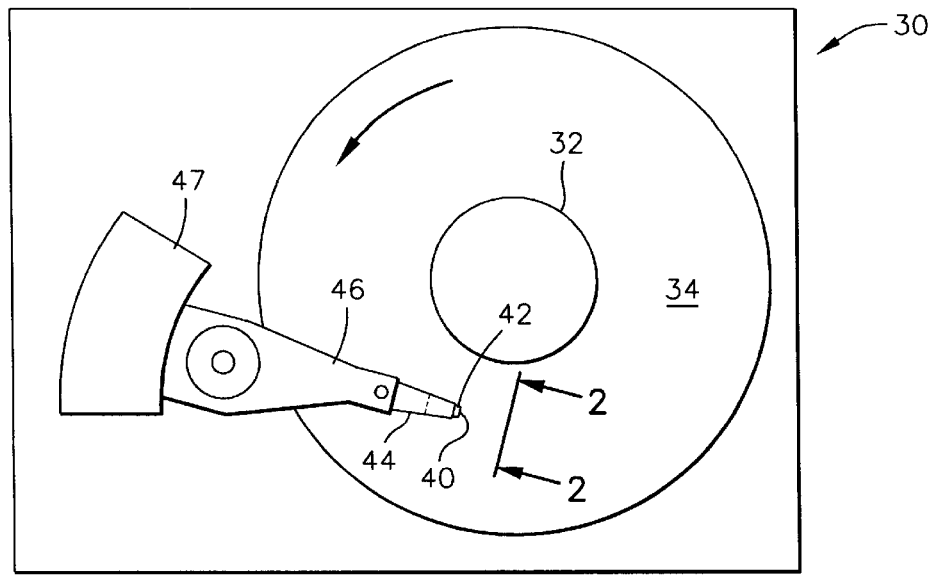
FIG. 1 is a plan view of an exemplary magnetic disk drive.
Figure 2:
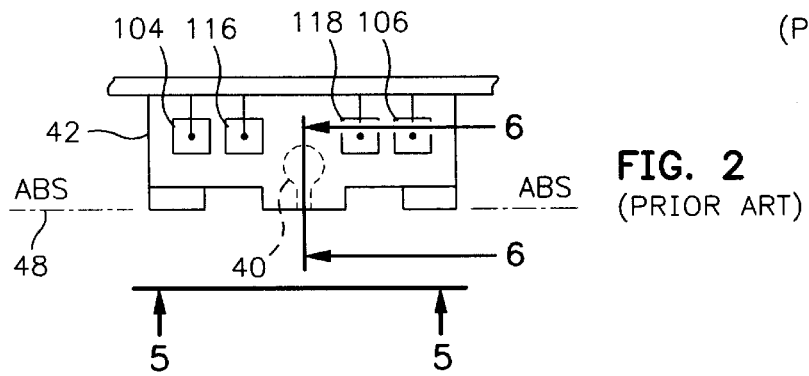
FIG. 2 is an end view of a slider with a magnetic head of the disk drive as seen in plane 2—2 of FIG. 1.
Figure 3:
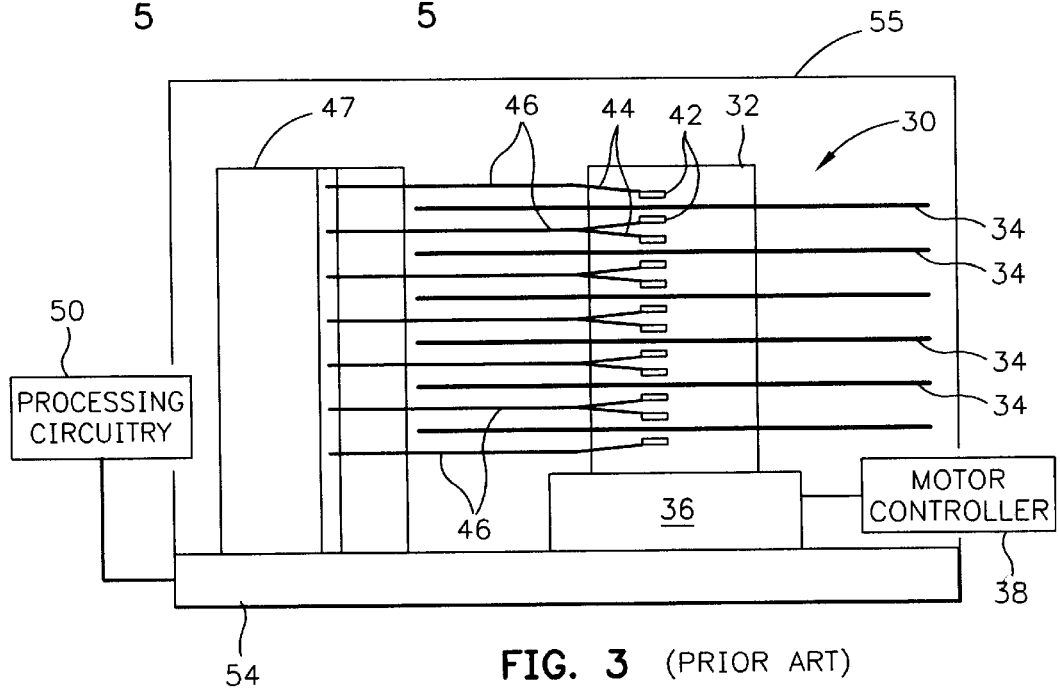
FIG. 3 is an elevation view of the magnetic disk drive wherein multiple disks and magnetic heads are employed.
Figure 4:
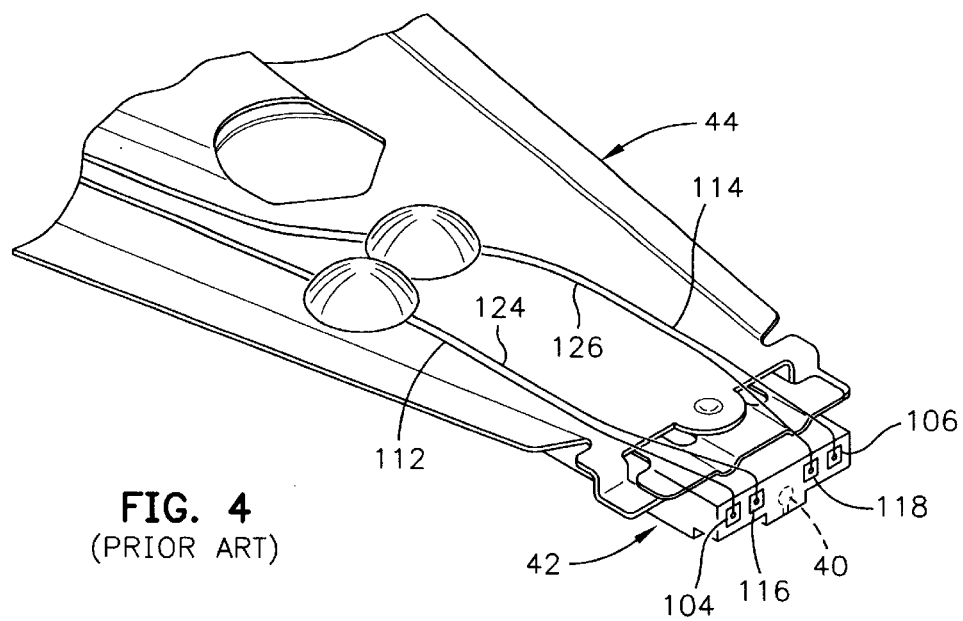
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
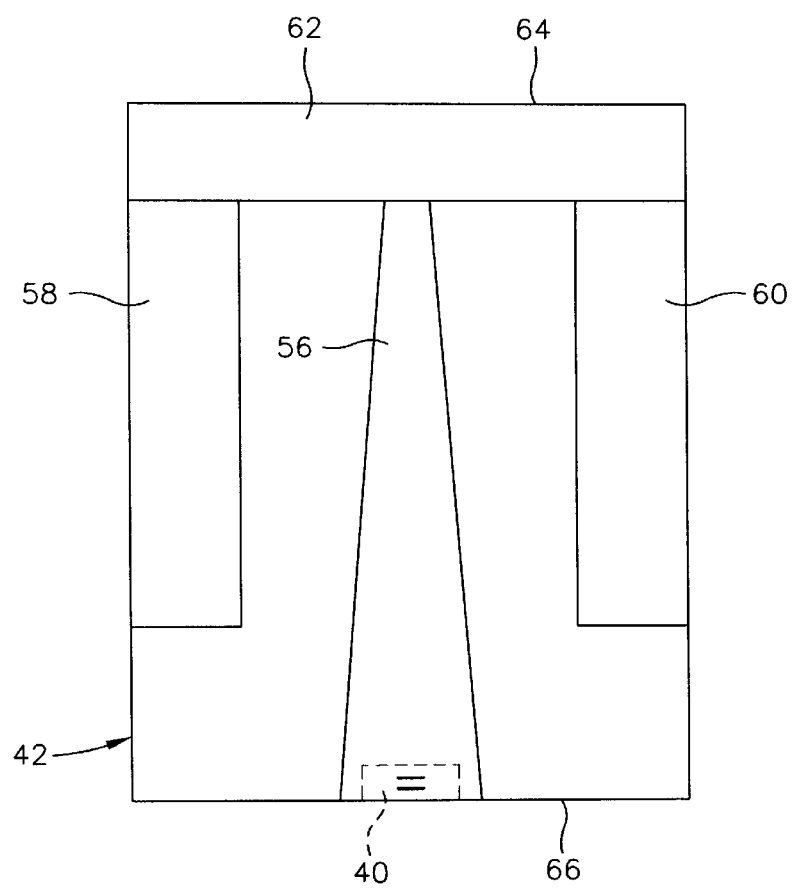
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
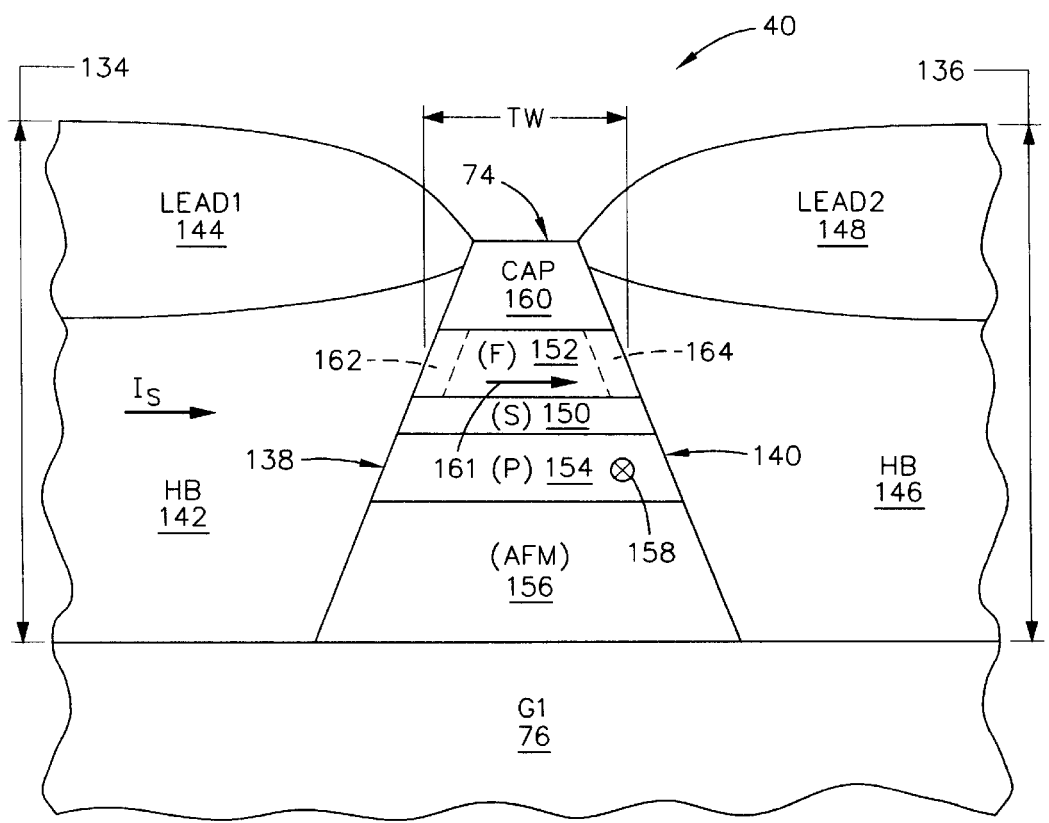
FIG. 9 is an enlarged isometric ABS illustration of a prior art read head with a contiguous junction type spin valve sensor.

FIG. 9 is an enlarged ABS illustration of a portion of the prior art read head 40 within the spin valve sensor 74 shown in FIG. 6. First and second hard bias and lead layers 134 and 136 are connected to first and second side surfaces 138 and 140 of the spin valve sensor 74. This connection is known in the art as a contiguous junction and is fully described in commonly assigned U.S. Pat. No. 5,018,037. The first hard bias and lead layers 134 include a first hard bias layer 142 and a first lead layer 144 and the second hard bias and lead layers 136 include a second hard bias layer 146 and a second lead layer 148. The hard bias layers 142 and 146 cause magnetic fields to extend longitudinally through the spin valve sensor 74 for stabilizing the free layer in a single domain state. The spin valve sensor 74 and the first and second hard bias and lead layers 134 and 136 are located between the first and second read gap layers 76 and 78 and the first and second read gap layers 76 and 78 are located between the ferromagnetic first and second shield layers 80 and 82 as shown in FIG. 7.

The spin valve sensor 74 includes a nonmagnetic electrically conductive spacer layer (S) 150 which is located between a ferromagnetic free layer structure (F) 152 and a ferromagnetic pinned layer structure (P) 154. The free layer structure 152 may be a single ferromagnetic layer, such as nickel iron, or a combined nickel iron layer and a cobalt iron layer wherein the cobalt iron layer interfaces the spacer layer 150. The pinned layer structure 154 may be a single ferromagnetic layer, as shown, such as cobalt iron, or an AP pinned layer structure, as described hereinabove, with first and second cobalt iron pinned layers. An antiferromagnetic (AFM) pinning layer 156 is exchange coupled to the pinned layer 154 for pinning a magnetic moment 158 of the pinned layer perpendicular to the ABS in a direction out of the sensor or into the sensor, as shown in FIG. 9. A cap layer 160, which may be tantalum, is located on top of the free layer 152 for protecting the spin valve sensor from subsequent processing steps. The free layer has a magnetic moment 161 which is oriented parallel to the ABS and to the major planes of the spin valve layers in a direction from right to left or from left to right, as shown in FIG. 9. When a field signal from the rotating magnetic disk rotates the magnetic moment 161 into the head the magnetic moments 161 and 158 become more parallel which decreases the resistance of the spin valve sensor to a sense current $I_S$ and when the field signal from the rotating magnetic disk rotates the magnetic moment 161 out of the head the magnetic moments 161 and 158 become more antiparallel which increases the resistance of the spin valve sensor to the sense current $I_S$. These resistance changes are processed as playback signals by the processing circuitry 50 in FIG. 3. The spin valve sensor has a track width (TW) which is defined by the distance between midpoints of first and second side surfaces of the free layer 152.

It is desirable that the track width of the spin valve sensor 74 be as narrow as possible for increasing the track width density of the read head. The track width density is quantified as tracks per inch (TPI) along a radius of the rotating magnetic disk. The linear bit density of the read head is defined by the distance between the first and second shield layers 80 and 82, as seen in FIG. 7. Linear bit density is quantified as bits per inch along a track of the rotating magnetic disk. A product of the tracks per inch and the bits per inch is referred to in the art as the areal density. Past efforts increasing the areal density has increased the storage capability of computers from kilobytes to megabytes to gigabytes.

As discussed hereinabove, the first and second hard bias layers 142 and 146 longitudinally bias the free layer 152 so as to stabilize the magnetic moment 162 of the free layer in a single magnetic domain state. Unfortunately, the first and second hard bias layers 142 and 146 pin magnetic moment portions in first and second side portions 162 and 164 of the free layer which prevents the magnetic moments in these side portions from rotating in response to field signals from the rotating magnetic disk. As the track width of the spin valve sensor is made more narrow the first and second side regions become a larger fraction of the sensor track width. The result is less of the free layer in the sensor track width area is available to sense the field signals from the rotating magnetic disk.

Figure 10:
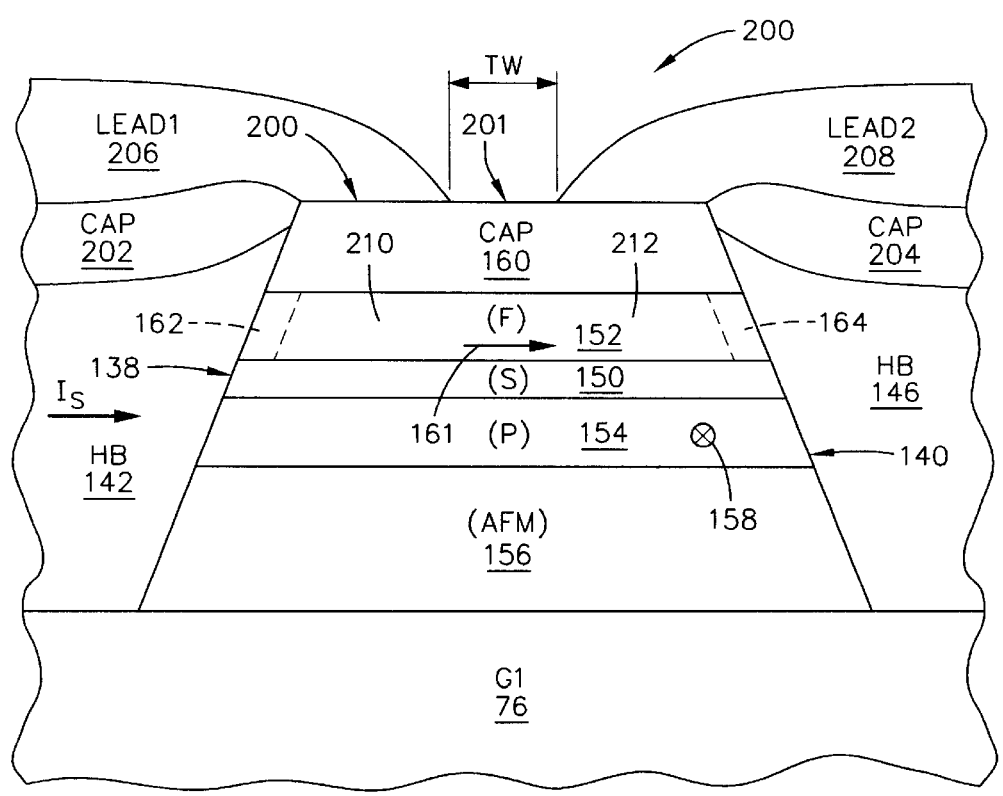
FIG. 10 is an enlarged isometric ABS illustration of a prior art read head with a continuous junction type spin valve sensor.

The aforementioned problem with the contiguous junction type spin valve sensor in FIG. 9 has been alleviated with a read head 200 that has a continuous type spin valve sensor 201, as shown in FIG. 10. The spin valve sensor 201 in FIG. 10 is the same as the spin valve sensor 74 in FIG. 9 except the layers of the spin valve sensor have been widened so that the first and second side surfaces 138 and 140 are laterally further away from the track width, the addition of first and second cap layer portions 202 and 204 which overlay the first and second hard bias layers 142 and 146 and electrically conductive first and second lead layers 206 and 208 which overlay the first and second cap layer portions 202 and 204 and first and second top surface portions of the cap layer 160. This type of sensor is also referred to in the art as an overlaid lead type of sensor. The distance between the leads 206 and 208 define the track width (TW) of the read head. It can now be seen that the pinned or dead regions 162 and 164 of the free layer are now outside of the track width so that they do not constitute a portion of the track width. Accordingly, the magnetic moment within the entire track width of the free layer is now more responsive to field signals from the rotating magnetic disk. Unfortunately, first and second portions 210 and 212 of the free layer structure between the track width portion of the free layer and the first and second pinned portions 162 and 164 have magnetic moments which respond to field signals from a rotating magnetic disk. Even though the first and second leads 206 and 208 have considerably lower resistance a small amount of the sense current $I_S$ is conducted through the portions 210 and 212 so that the magnetic moments of the first and second free layer portions 210 and 212 respond to field signals from tracks on the rotating magnetic disk that are adjacent to the track being read by the track width portion of the free layer. This contributes to what is known in the art as side reading which is unacceptable performance for a spin valve sensor. It is this problem that the present invention addresses.

The Invention

Figure 11:
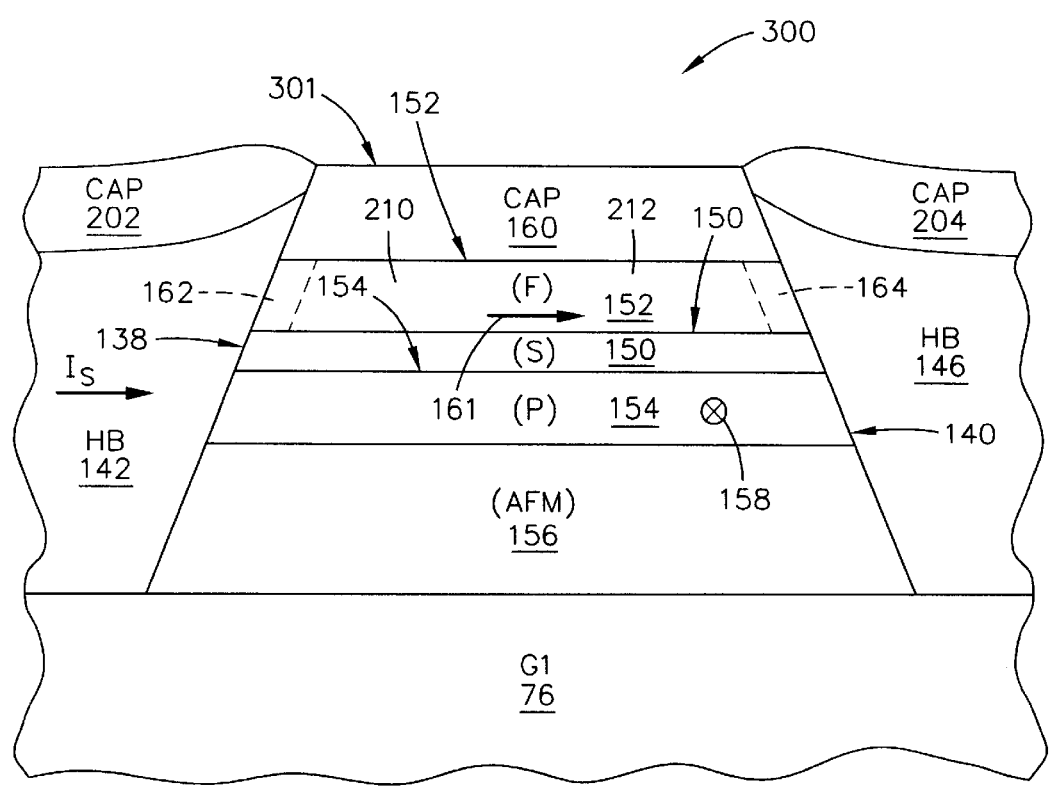
FIG. 11 is an ABS illustration of the present spin valve sensor before forming first and second overlaid leads.

Six embodiments of the present invention are described herein. The first five embodiments embody the partially fabricated read head 300 and spin valve sensor 301 in FIG. 11. FIG. 11 is the same as FIG. 10 except the first and second lead layers 206 and 208 are omitted. The spin valve sensor 301 in FIG. 11 is referred to as a bottom spin valve sensor since the pinning layer 156 is at the bottom of the sensor closer to the first read gap layer 76 than to the second read gap layer 78 shown in FIG. 6. It should be noted that each of the layers of the spin valve sensor 301 have first and second side surfaces which, in combination, form the first and second side surfaces 138 and 140 described hereinabove. In a broad concept of one aspect of the invention the first and second side surfaces of the layers of the spin valve sensor are selectively notched in order to reduce the magnetoresistive coefficient dr/R of side regions of the sensor beyond the track width so as minimize side reading by the sensor.

Figure 12A:
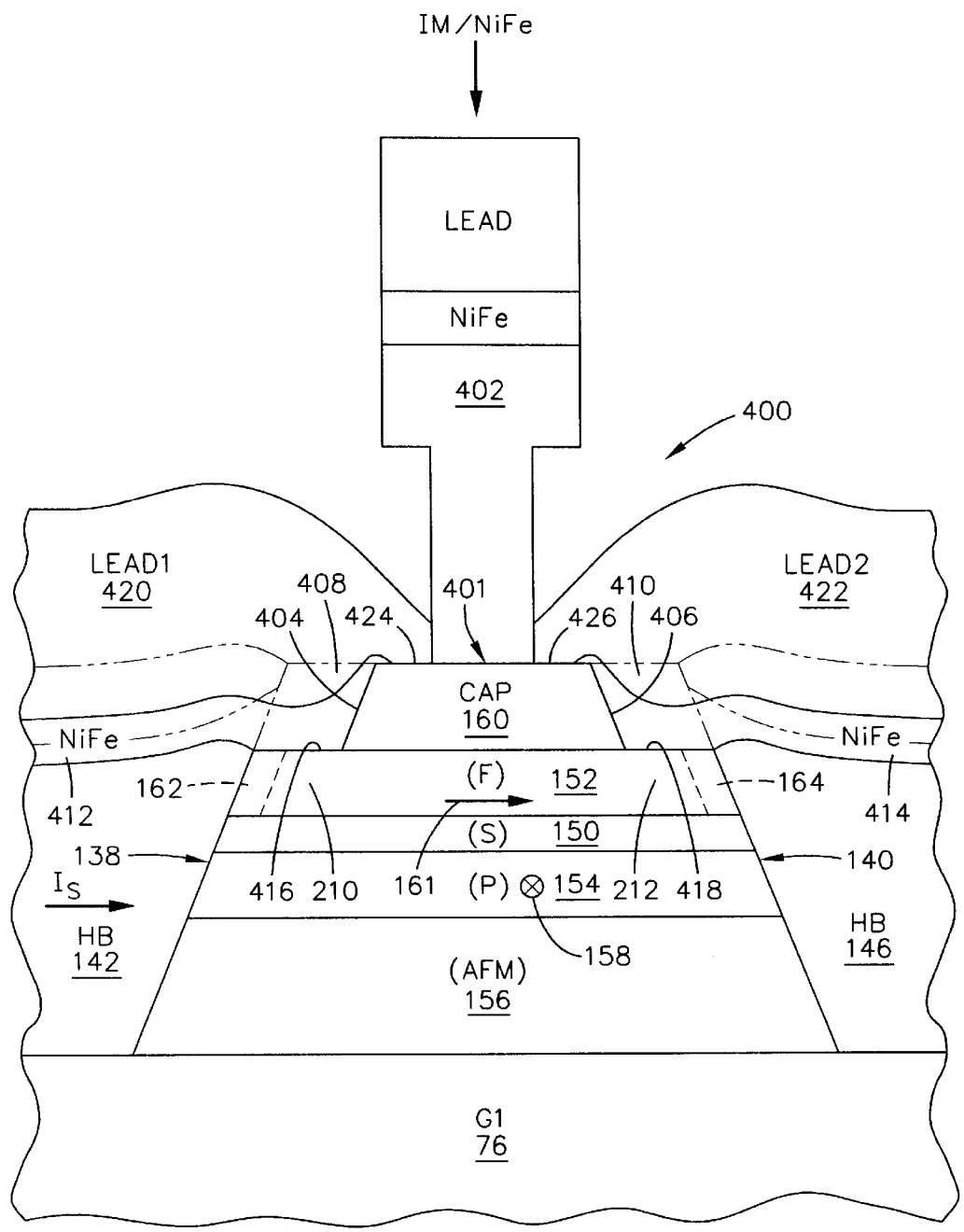
FIG. 12A is an ABS view of the first embodiment of the present spin valve sensor after ion milling first and second notches and forming first and second refill layers and first and second conductive leads in the notches.
Figure 12B:
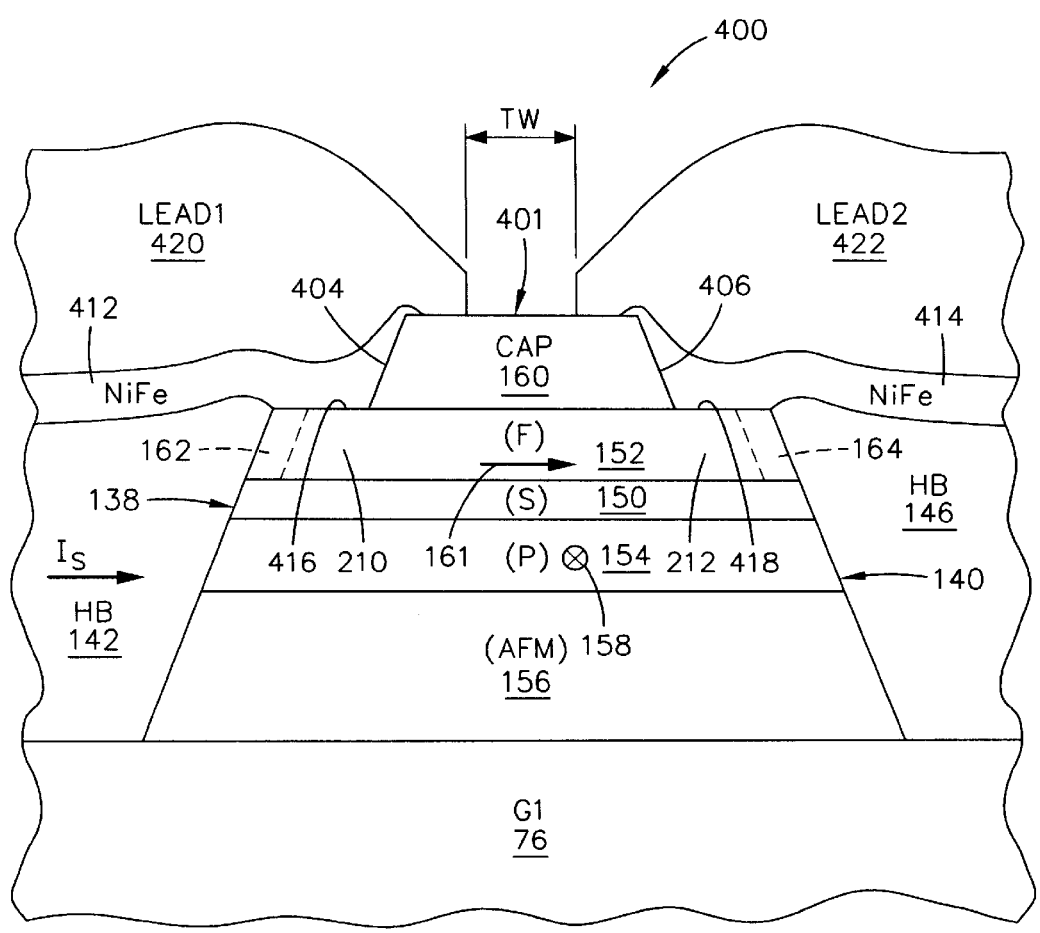
FIG. 12B is the same as FIG. 12A except a bilayer photoresist layer has been removed.

A partial fabrication of a first embodiment of the read head 400 with the present spin valve sensor 401 is shown in FIG. 12A. A bilayer photoresist 402 is formed on top of the cap layer 160 for defining the track width (TW) of the read head. In a step of a method of the invention ion milling is implemented which removes side portions of the cap layer 160 down to the free layer 152. The removal of the Ta layer can also be done with a reactive ion etching (RIE) process for better selectivity. The original locations of the layers that have been removed are shown in phantom. The result is that first and second side surfaces 404 and 406 of the cap layer are recessed relative to the first and second side surfaces of the layers therebelow. This forms the spin valve sensor with first and second notches 408 and 410. Next, in the method of the invention ferromagnetic first and second refill layers 412 and 414, which may be nickel iron (NiFe), are disposed in the first and second notches 408 and 410 interfacing first and second top surface portions 416 and 418 of the free layer structure and overlaying the first and second hard bias layers 142 and 146. First and second lead layers 420 and 422 are deposited on top of the refill layers 412 and 414 and on top of top surface portions 424 and 426 of the cap layer. In this embodiment the first and second refill layers 412 and 414 have essentially increased the magnetic thickness of the free layer portions 210 and 212. The increase in thickness of each of the portions 210 and 212 decreases the magnetoresistive coefficient dr/R of these portions so that the capability of these portions to side read adjacent tracks has been minimized. Further, the thicker portions 210 and 212 render the free layer more resistant to demagnetization. FIG. 12B is the same as FIG. 12A except the bilayer photoresist 402 has been lifted off of the sensor by dissolving the lower portion of the bilayer resist leaving the track width (TW).

Figure 13A:
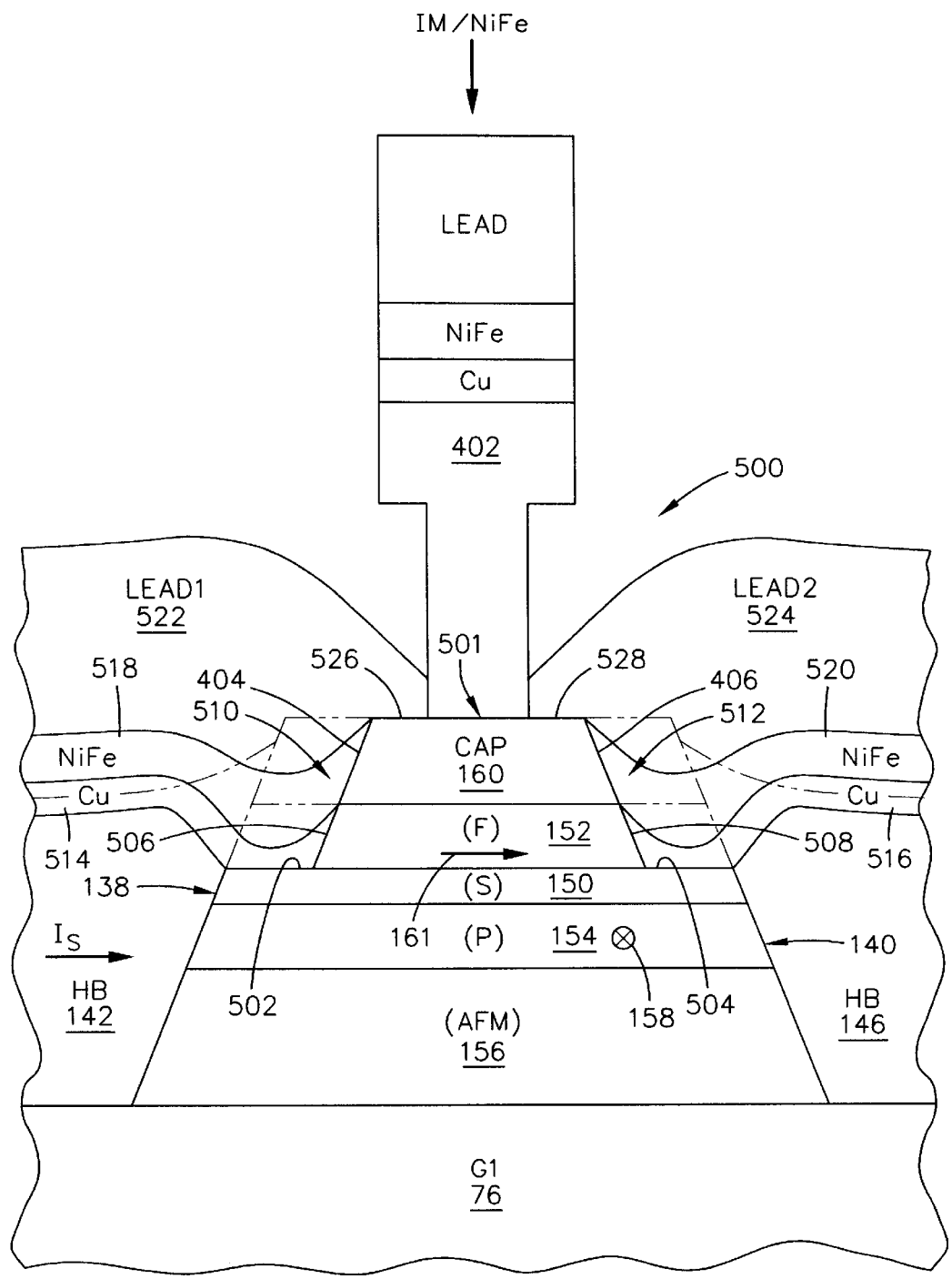
FIG. 13A is an ABS illustration of a second embodiment of the present spin valve sensor wherein first and second notches have been formed and first and second copper layers, first and second ferromagnetic layers and first and second leads have been formed in the notches.
Figure 13B:
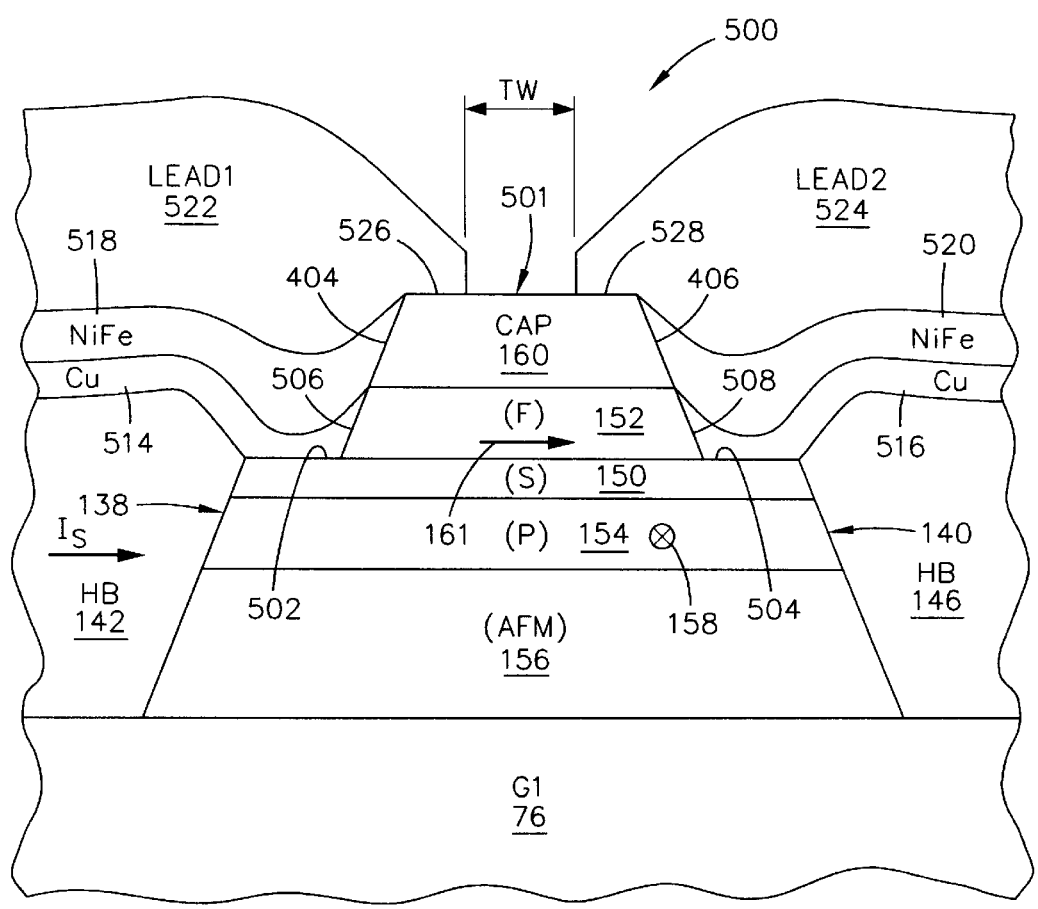
FIG. 13B is the same as FIG. 1A except a bilayer photoresist layer has been removed.

FIG. 13A illustrates a second embodiment of the present read head 500 and sensor 501 which is the same as the first embodiment shown in FIG. 12A except for ion milling of the layers and the refill layers. In this embodiment ion milling (IM) is implemented to mill away first and second side portions of the cap layer 160 and first and second side portions of the free layer 152 down to first and second top surface portions 502 and 504 of the spacer layer 150. This forms the cap layer 160 with first and second side surfaces 404 and 406 and the free layer 152 with first and second side surfaces 506 and 508 which are recessed relative to the side surfaces of the layers therebelow which, in turn, provides the spin valve sensor 501 with first and second notches 510 and 512. The original locations of the layers before ion milling are shown in phantom. Nonmagnetic electrically conductive first and second refill layers 514 and 516, which are preferably copper (Cu), are then deposited into the notches 510 and 512 on top of the top surface portions 502 and 504 and on top of the first and second hard bias layers 142 and 146. Ferromagnetic third and fourth refill layers 518 and 520, which are preferably nickel iron (NiFe), are then deposited on top of the first and second refill layers 514 and 516. Finally, first and second lead layers 522 and 524 are deposited on top of the third and fourth refill layers 518 and 520 and on top of first and second top surface portions 526 and 528 of the cap layer. In FIG. 13B the bilayer photoresist 402 is lifted off, as discussed hereinabove. By increasing the thickness of the side portions of the spacer layer 150 on top of the top surfaces 502 and 504 the magnetoresistive coefficient dr/R of the spin valve sensor portions between the track width (TW) and the hard bias layers 142 and 146 is significantly decreased. Again this will minimize side reading of adjacent tracks to the track being read by the sensor.

Figure 14A:
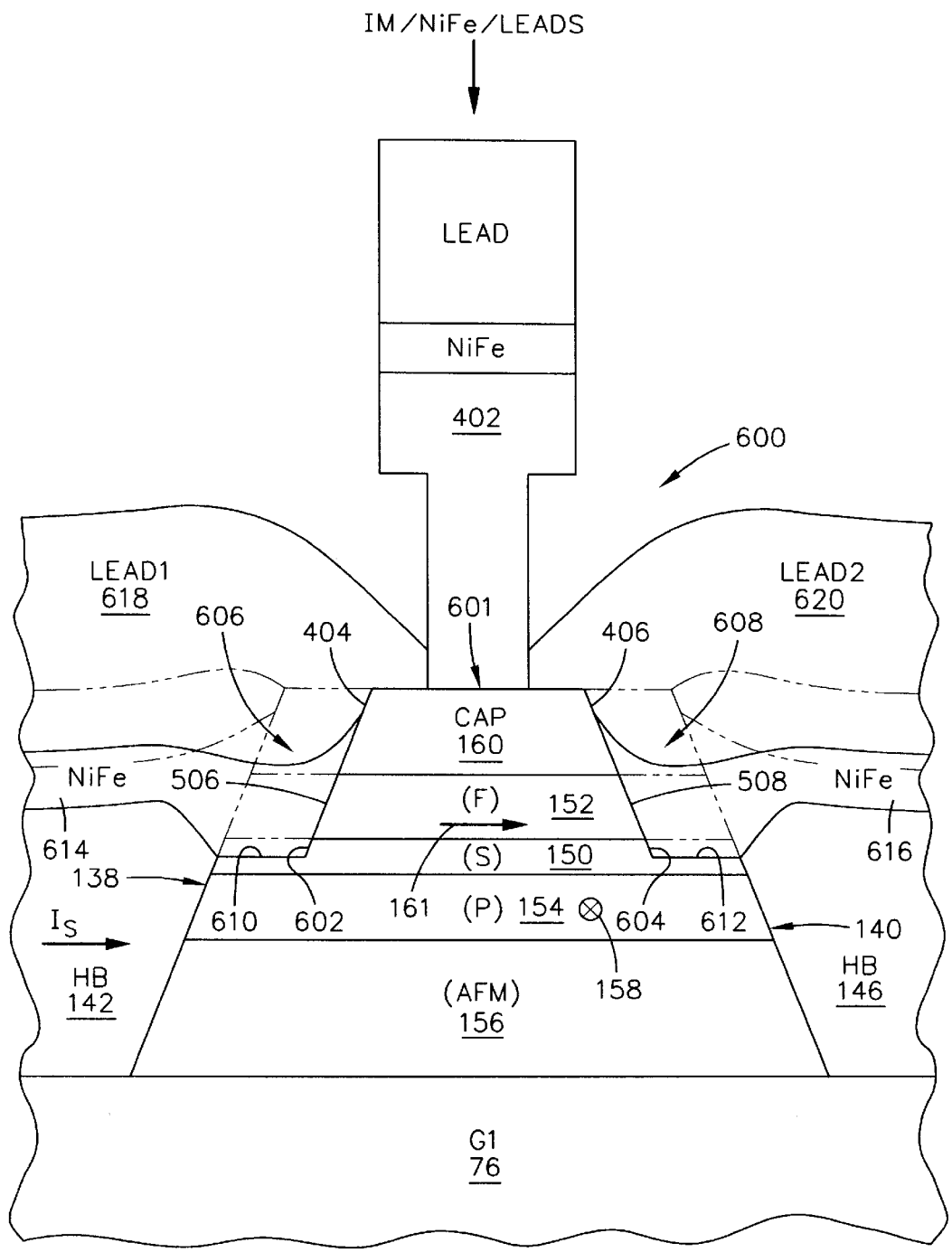
FIG. 14A is an ABS illustration of a third embodiment of the present spin valve sensor after ion milling first and second notches and forming first and second ferromagnetic layers and first and second leads in the notches.
Figure 14B:
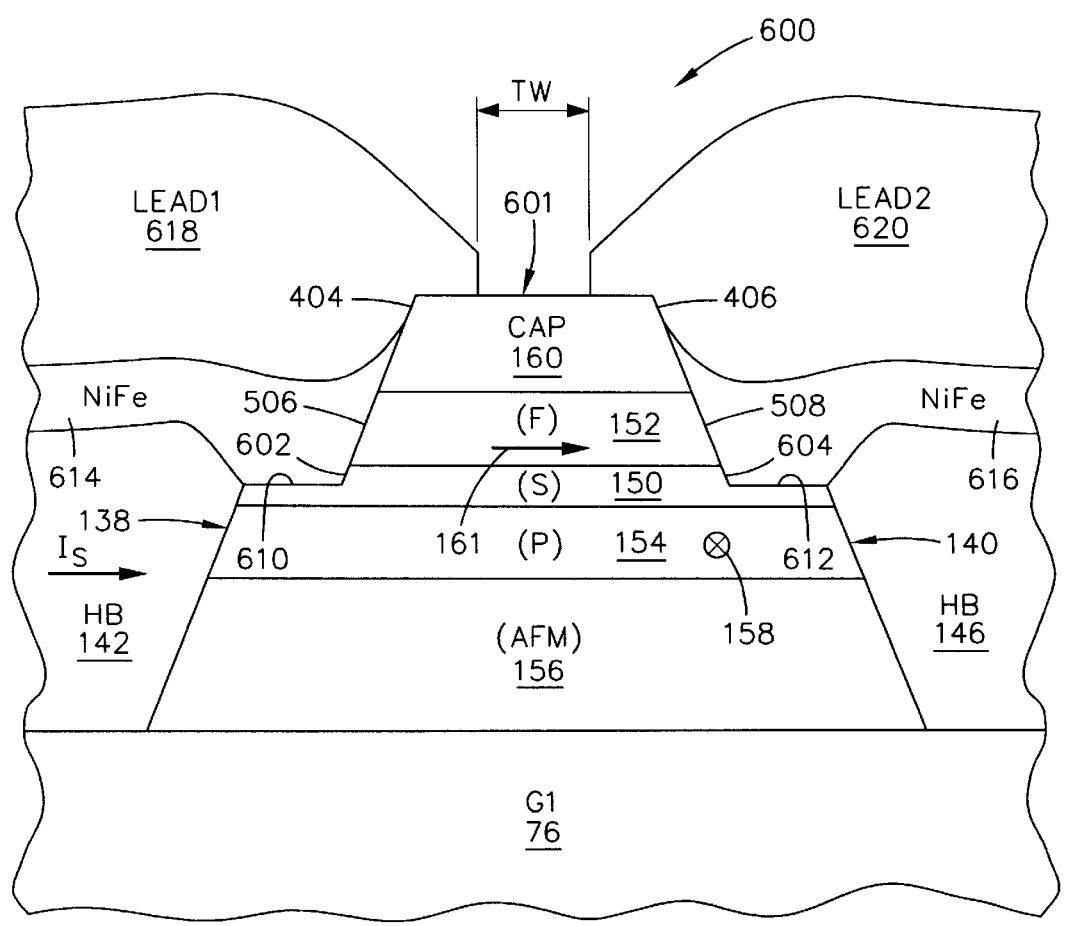
FIG. 14B is the same as FIG. 14A except a bilayer photoresist layer has been removed.

FIG. 14A illustrates a third embodiment of the present read head 600 and spin valve sensor 601 which is the same as the embodiment in FIG. 13A except for the ion milling step and the refill layers. Ion milling (IM) is implemented to remove first and second side portions of the cap layer 160, first and second side portions of the free layer 152 and portions of first and second side portions of the spacer layer 150. This provides the cap layer with first and second side surfaces 404 and 406, the free layer with first and second side surfaces 506 and 508 and the spacer layer with first and second side surfaces 602 and 604. The side surfaces 404, 406, 506, 508, 602 and 604 are recessed relative to the side surfaces of the layers therebelow. This provides the spin valve sensor with first and second notches 606 and 608. The original locations of the layers ion milled are shown in phantom. The ion milling also provides the first and second side portions of the spacer layer with first and second top surfaces 610 and 612. Ferromagnetic first and second refill layers 614 and 616, which are preferably nickel iron (NiFe), are then deposited into the notches 606 and 608 on top of the first and second hard bias layers 142 and 146. In this embodiment the first and second side portions of the spacer layer below the top surfaces 610 and 612 have been reduced in thickness so that a coupling field between the pinned layer 154 and extended portions of the free layer due to deposition of the first and second refill layers 614 and 616 pin magnetic moments of the extended portions of the free layer so as to minimize the magnetoresistive coefficient dr/R beyond the track width (TW) of the sensor. In FIG. 14B the bilayer photoresist 402 has been removed to provide the track width (TW) as discussed hereinabove.

Figure 15A:
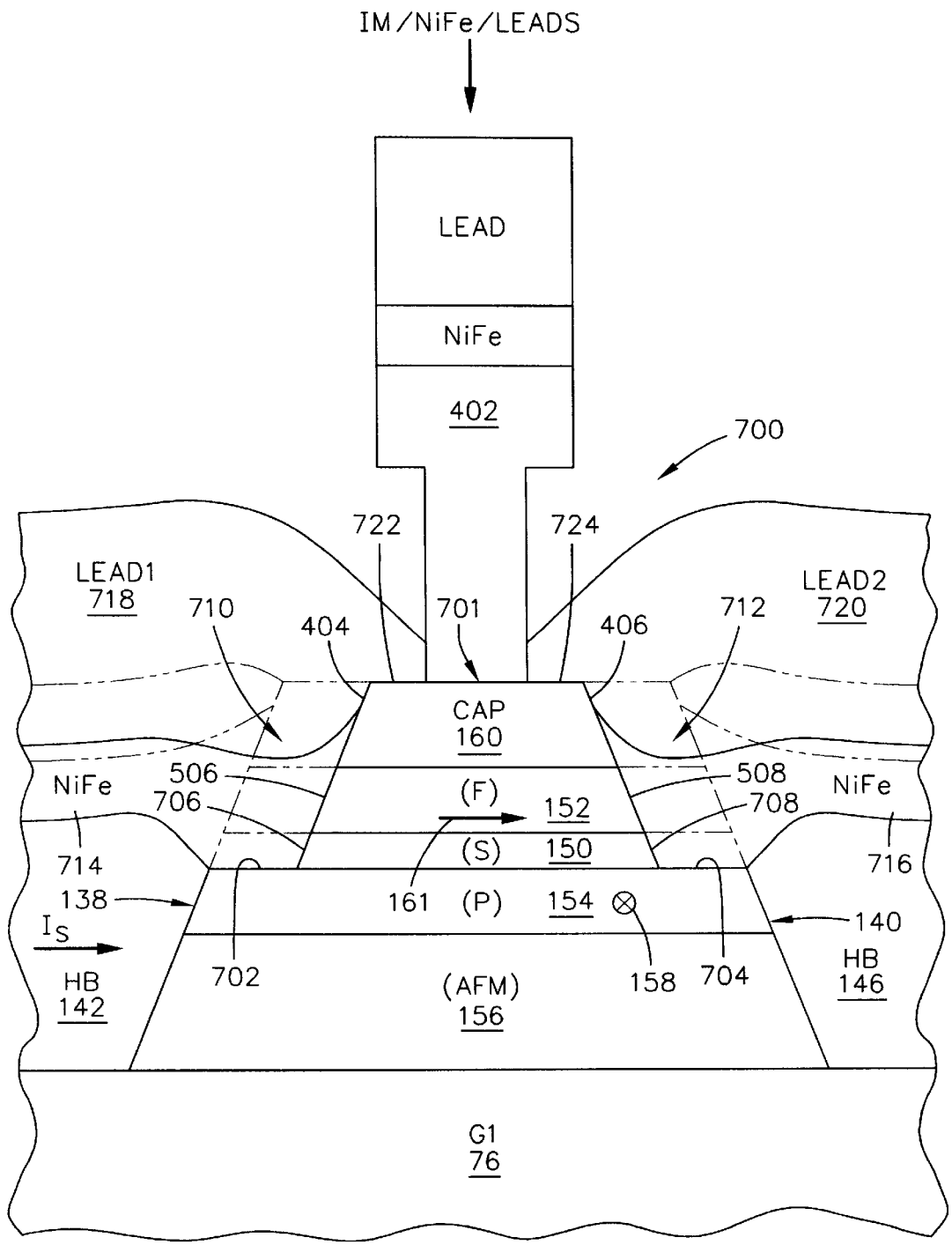
FIG. 15A is an ABS illustration of a fourth embodiment of the present spin valve sensor after ion milling first and second notches and forming first and second ferromagnetic layers and first and second leads in the notches.
Figure 15B:
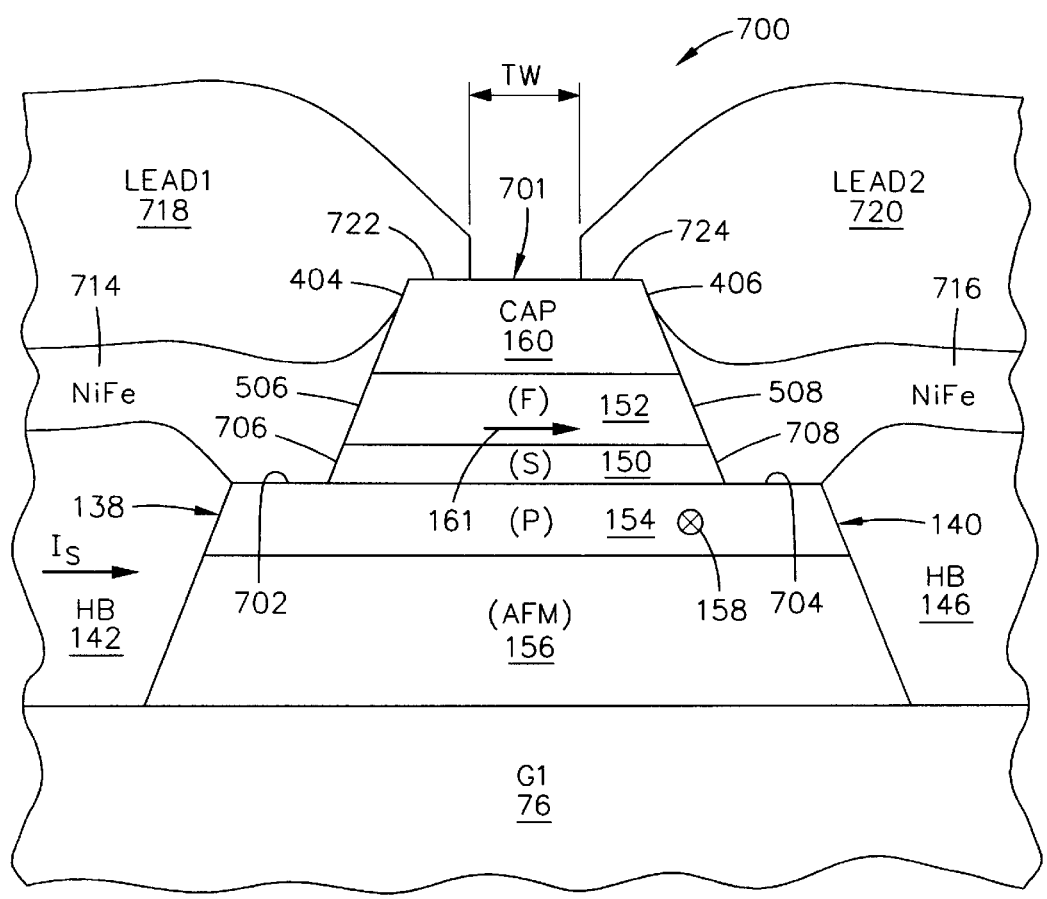
FIG. 15B is the same as FIG. 15A except a bilayer photoresist layer has been removed.

FIG. 15A is a partially completed fourth embodiment of the present read head 700 and sensor 701 which is the same as the embodiment in FIG. 14A except for the ion milling and the refill layers. Ion milling is implemented to remove first and second side portions of the cap layer 160, first and second side portions of the free layer 152 and first and second side portions of the spacer layer 150 down to first and second top portions 702 and 704 of the pinned layer. This provides the cap layer with first and second side surfaces 404 and 406, the free layer structure with first and second side surfaces 506 and 508 and the spacer layer with first and second side surfaces 706 and 708 which are recessed relative to the side surfaces of the layers therebelow which form first and second notches 710 and 712. Ferromagnetic first and second refill layers 714 and 716, which are preferably nickel iron (NiFe), are then deposited in the notches 710 and 712 on top of the top surfaces 702 and 704 and on top of the first and second hard bias layers 142 and 146. First and second lead layers 718 and 720 are then deposited on top of the first and second refill layers 714 and 716 and on top of first and second top surface portions 722 and 724 of the cap layer. In FIG. 15B the bilayer photoresist 402 is removed as discussed hereinabove. The pinning strength of the pinning layer 156 is inversely proportional to the thickness of the pinned layer 154. Accordingly, the thicker first and second side portions of the pinned layer due to the deposition of the first and second refill layers 714 and 716 effectively reduces the pinning of the magnetic moment of these portions of the pinned layer so as to minimize the magnetoresistive coefficient dr/R outside of the track width. This then minimizes side reading by the spin valve sensor.

Figure 16:
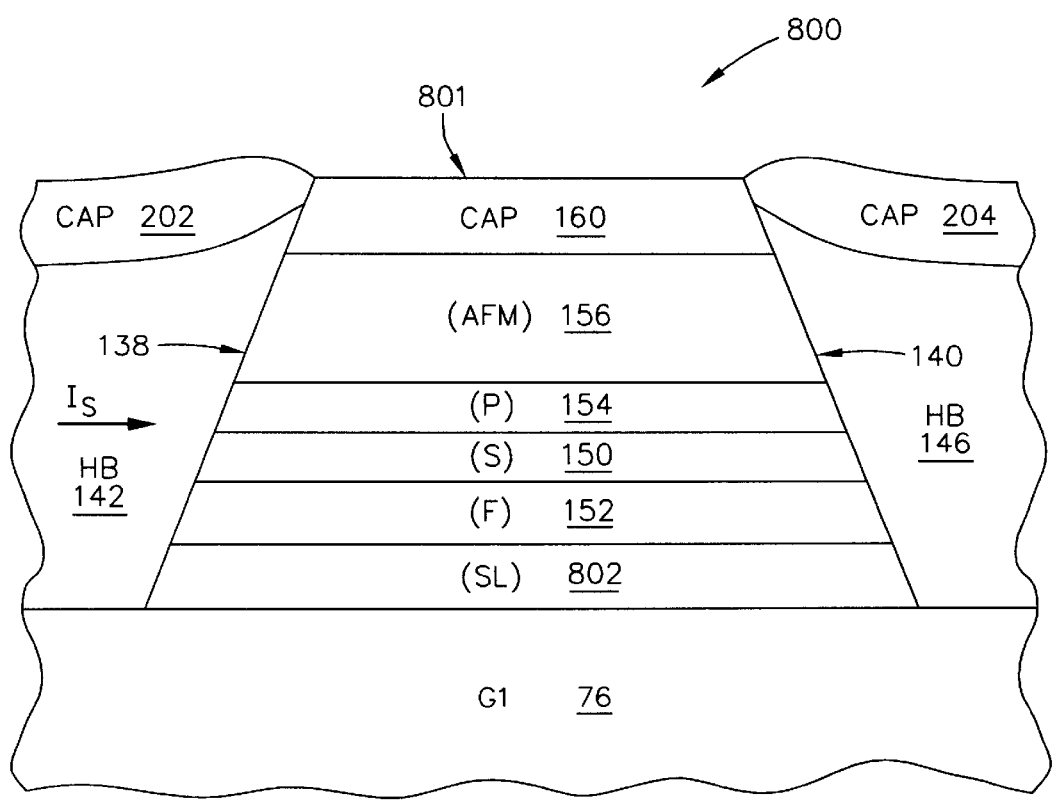
FIG. 16 is an ABS illustration of a top spin valve sensor which has been partially completed.
Figure 17A:
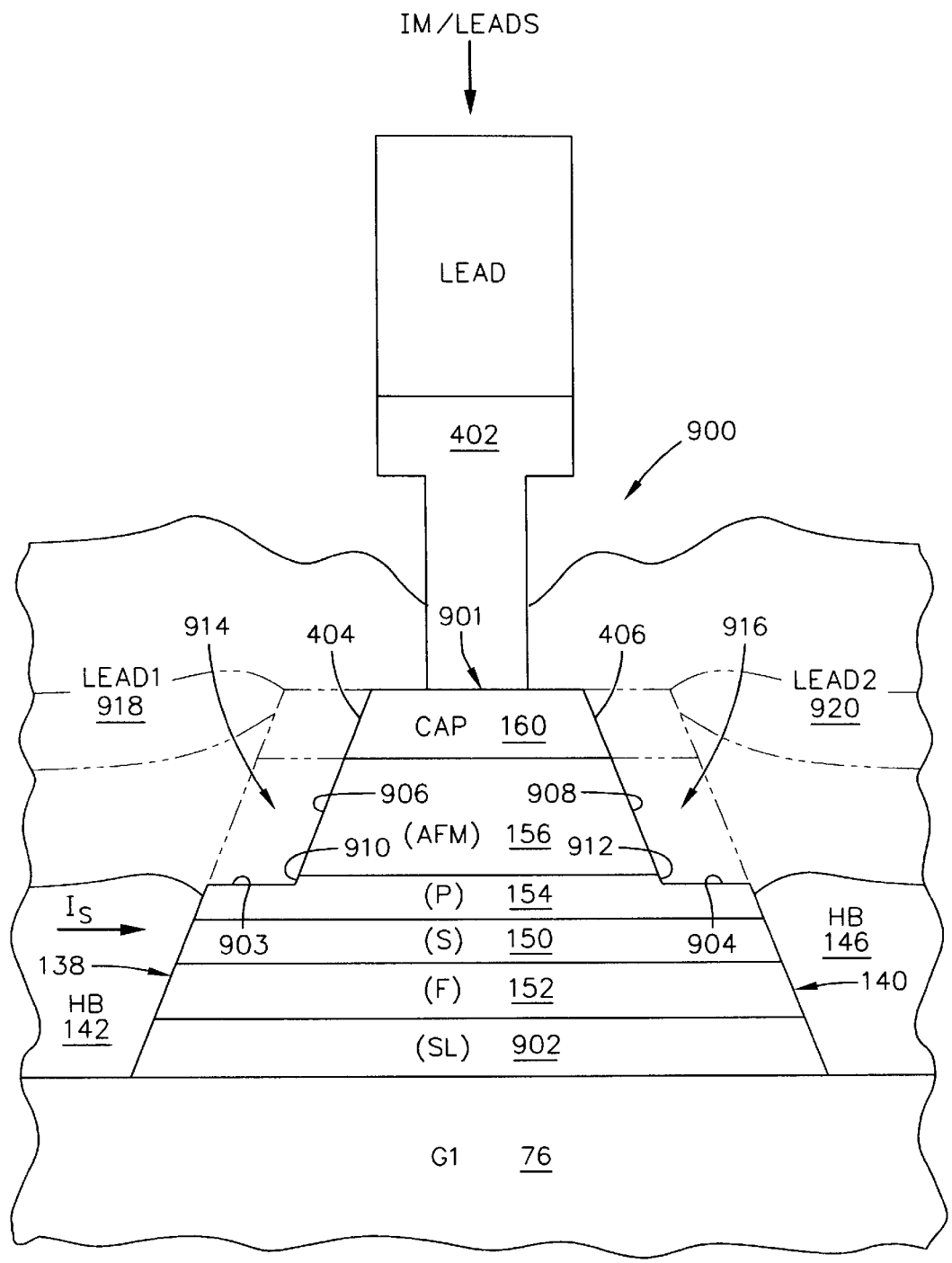
FIG. 17A is and ABS illustration of a firth embodiment of the present spin valve sensor after ion milling first and second notches and depositing first and second conductive leads in the notches.
Figure 17B:
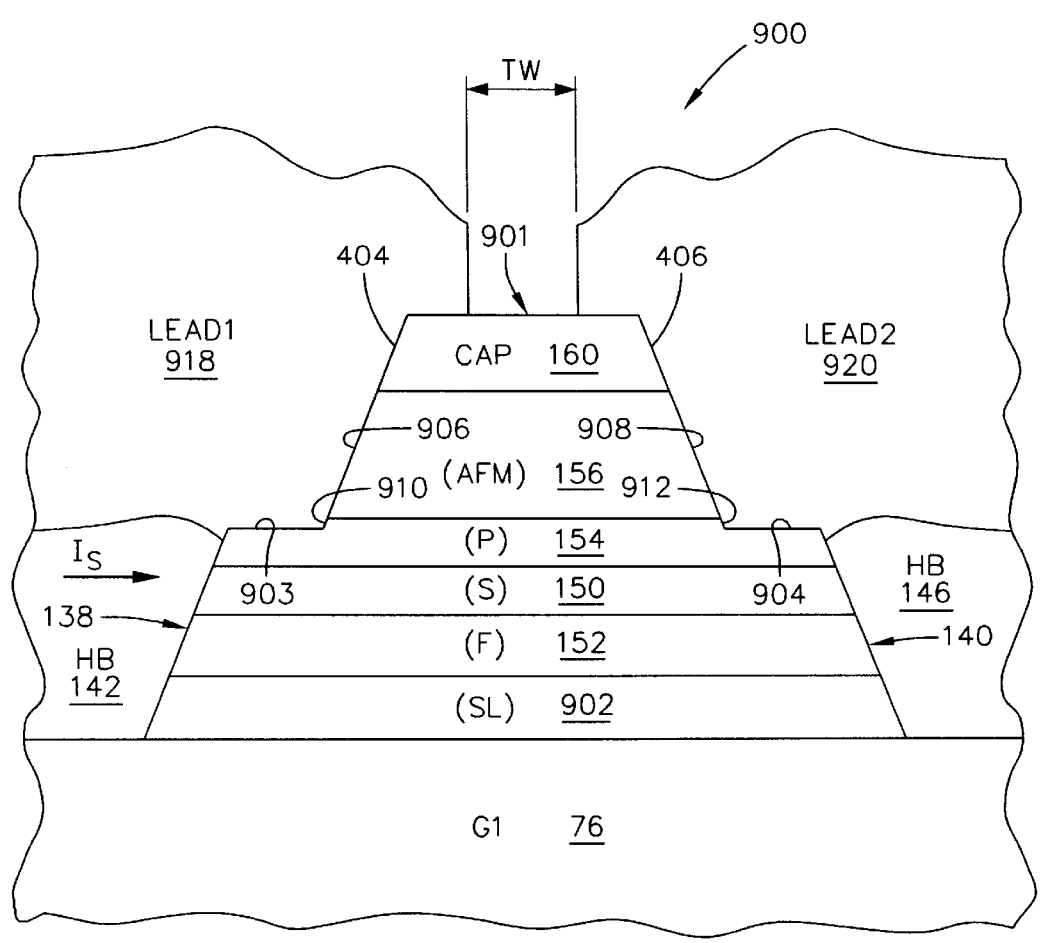
FIG. 17B is the same as FIG. 17A except a bilayer photoresist layer has been removed.

The partially completed read head 800 and spin valve sensor 801 in FIG. 16 is the same as the read head and spin valve sensor in FIG. 11 except the free layer 152, the spacer layer 150, the pinned layer 154 and the pinning layer 156 have been inverted and one or more seed layers (SL) 802 are provided below the free layer 152. FIG. 17A is a fifth embodiment of the present read head 900 and sensor 901 is the same as the partially completed read head 800 and sensor 801 in FIG. 16 except for ion milling steps and deposition of certain layers. The bilayer photoresist 402 is located on top of the cap layer 160 as discussed hereinabove. Ion milling (IM) is implemented to mill away first and second side portions of the cap layer 160, first and second side portions of the pinning layer 156 and optionally portions of first and second side portions of the pinned layer 154 (overmilling) to form first and second side portions of the pinned layer with first and second top surface portions 903 and 904. This provides the cap layer with first and second side surfaces 404 and 406, the pinning layer with first and second side surfaces 906 and 908 and optionally the pinned layer with first and second side surfaces 910 and 912 which are recessed relative to the side surfaces of the layers therebelow. This provides the spin valve sensor with first and second notches 914 and 916. First and second lead layers 918 and 920 are then deposited into the notches 914 and 916 on top of the top surfaces 903 and 904 and on top of the first and second hard bias layers 142 and 146. In FIG. 17B the bilayer photoresist 402 is removed as discussed hereinabove. In this embodiment the side portions or remaining side portions of the pinned layer 154 beyond the track width are no longer pinned by the pinning layer 156. Therefore the magnetoresistive coefficient dr/R in the side portions of the read head beyond the track width has been eliminated or at least reduced to eliminate or at least minimize side reading.

DISCUSSION

It should be noted that after the ion milling in FIG. 12A the first and second hard bias layers 142 and 144 engage the first and second side surfaces of the free layer 152 for longitudinally biasing the free layer. In FIG. 13A the first and second copper refill layers 514 and 516 are sufficiently thin so that there is a magnetic coupling between the first and second hard bias layers 142 and 146 and the first and second ferromagnetic refill layers 518 and 520 so that the ferromagnetic refill layers 518 and 520 longitudinally bias the free layer 152. In FIG. 14A the first and second ferromagnetic refill layers 614 and 616 interface the first and second hard bias layers 142 and 146 as well as the first and second side surfaces 506 and 508 of the free layer structure so that the free layer structure is longitudinally biased. In FIG. 15A the first and second ferromagnetic refill layers 714 and 716 interface the first and second hard bias layers 142 and 146 as well as the first and second side surfaces 506 and 508 of the free layer structure so that the free layer structure is longitudinally biased. After ion milling in FIG. 17A the first and second hard bias layers 142 and 146 continue to be in engagement with first and second side surfaces of the free layer 152 so as to longitudinally bias the free layer.

While a preferred material for the ferromagnetic refill layers is nickel iron (NiFe), it should be understood that other ferromagnetic materials may be employed, such as cobalt iron (CoFe), cobalt (Co) or iron nitride (FeN). An exemplary material for the first and second hard bias layers 142 and 146 is cobalt platinum chromium (CoPtCr) and an exemplary material for the pinning layer 156 is platinum manganese (PtMn). In order to provide a sufficient pinning strength the thickness of the platinum manganese should be approximately 150 Å. The layers formed in the various embodiments may be accomplished by well-known sputter deposition techniques. The bilayer photoresist has a thinner lower layer portion which is not closed off during sputtering of the layers. Accordingly, the bilayer photoresist can be lifted off by immersing it in a solvent which dissolves the lower layer portion according to well-known techniques.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head which has an air bearing surface (ABS), comprising:
   a spin valve sensor that has a top surface, a bottom surface and first and second side surfaces which intersect the ABS;
   the spin valve sensor including:
      a ferromagnetic pinned layer structure that has a magnetic moment;
      a pinning layer exchange coupled to the pinned layer structure for pinning the magnetic moment of the pinned layer structure;
      a ferromagnetic free layer structure that has a magnetic moment that is free to rotate in response to a field signal;
      a nonmagnetic electrically conductive spacer layer located between the free layer structure and the pinned layer structure;
      a cap layer forming said top surface of the sensor; and
      each of the pinned layer structure, the pinning layer structure, the free layer structure and the spacer layer having first and second side surfaces which form said first and second side surfaces respectively of the sensor;
   first and second hard bias layers that interface said first and second side surfaces of the sensor;
   a top portion of the first side surface having a first notch and a top portion of the second side surface having a second notch;
   the first and second notches being sized to enable a reduction of a magnetoresistive coefficient of first and second side portions of the sensor beyond a track width of the sensor;
   said first and second notches being at least partially formed by first and second side surfaces of the cap layer being recessed from first and second side surfaces of a remainder of the spin valve sensor so as to expose first and second top surfaces of one of the free, spacer and pinned layers; and
   nonmagnetic electrically conductive first and second lead layers overlaying the first and second hard bias layers respectively, disposed in the first and second notches respectively, interfacing the first and second top surfaces respectively of one of said free, spacer and pinned layers and being spaced apart by a distance that defines a track width of the read head.

2. A magnetic read head as claimed in claim 1 including:
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 including:
   the free layer structure being located between and interfacing the spacer and cap layers; and
   the pinned layer structure being located between and interfacing the spacer layer and the pinning layer.

4. A magnetic read head as claimed in claim 3 including:
   said first and second notches being formed by the first and second side surfaces of the cap layer being recessed relative to the first and second side surfaces respectively of the free layer structure, the spacer layer, the pinned layer structure and the pinning layer so as to expose first and second top surface portions of the free layer structure; and
   first and second ferromagnetic refill layers disposed in the first and second notches respectively and interfacing the first and second top surface portions respectively of the free layer structure with the first ferromagnetic refill layer also being located between the first hard bias layer and the first lead layer and the second ferromagnetic refill layer also being located between the second hard bias layer and the second lead layer.

5. A magnetic head assembly having an air bearing surface (ABS), comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   a read head including:
      a spin valve sensor;
      nonmagnetic electrically nonconductive first and second read gap layers;

the spin valve sensor being located between the first and second read gap layers;
a ferromagnetic first shield layer;
the first and second gap layers being located between the first shield layer and the first pole piece layer; and
the spin valve sensor having a top surface, a bottom surface and first and second side surfaces which intersect the ABS;
the spin valve sensor including:
a ferromagnetic pinned layer structure that has a magnetic moment;
a pinning layer exchange coupled to the pinned layer structure for pinning the magnetic moment of the pinned layer structure;
a ferromagnetic free layer structure that has a magnetic moment that is free to rotate in response to a field signal;
a nonmagnetic electrically conductive spacer layer located between the free layer structure and the pinned layer structure;
a cap layer forming said top surface of the sensor; and
each of the pinned layer structure, the pinning layer structure, the free layer structure, the spacer layer and the cap layer having first and second side surfaces which form said first and second side surfaces respectively of the sensor;
first and second hard bias layers that interface said first and second side surfaces of the sensor;
a top portion of the first side surface having a first notch and a top portion of the second side surface having a second notch;
the first and second notches being sized to enable a reduction of a magnetoresistive coefficient of first and second side portions of the sensor beyond a track width of the sensor;
said first and second notches being at least partially formed by first and second side surfaces of the cap layer being recessed from first and second side surfaces of a remainder of the spin valve sensor so as to expose first and second top surfaces of one of the free, spacer and pinned layers; and
nonmagnetic electrically conductive first and second lead layers overlaying the first and second hard bias layers respectively, disposed in the first and second notches respectively, interfacing the first and second top surfaces respectively of one of said free, spacer and pinned layers and being spaced apart by a distance that defines a track width of the read head.

6. A magnetic head assembly as claimed in claim 5 including:
the free layer structure being located between and interfacing the spacer and cap layers; and
the pinned layer structure being located between and interfacing the spacer layer and the pinning layer.

7. A magnetic head assembly as claimed in claim 6 including:
said first and second notches being formed by the first and second side surfaces of the cap layer being recessed relative to the first and second side surfaces respectively of the free layer structure, the spacer layer, the pinned layer structure and the pinning layer so as to expose first and second top surface portions of the free layer structure; and
first and second ferromagnetic refill layers disposed in the first and second notches respectively and interfacing the first and second top surface portions respectively of the free layer structure with the first ferromagnetic refill layer also being located between the first hard bias layer and the first lead layer and the second ferromagnetic refill layer also being located between the second hard bias layer and the second lead layer.

8. A magnetic disk drive including at least one magnetic head assembly that has an air bearing surface (ABS) and that includes a write head and a read head, comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a spin valve sensor;
nonmagnetic electrically nonconductive first and second read gap layers;
the spin valve sensor being located between the first and second read gap layers;
a ferromagnetic first shield layer;
the first and second read gap layers being located between the first shield layer and the first pole piece layer; and
the spin valve sensor having a top surface, a bottom surface and first and second side surfaces which intersect the ABS;
the spin valve sensor including:
a ferromagnetic pinned layer structure that has a magnetic moment;
a pinning layer exchange coupled to the pinned layer structure for pinning the magnetic moment of the pinned layer structure;
a ferromagnetic free layer structure that has a magnetic moment that is free to rotate in response to a field signal;
a nonmagnetic electrically conductive spacer layer located between the free layer structure and the pinned layer structure;
a cap layer forming said top surface of the sensor; and
each of the pinned layer structure, the pinning layer structure, the free layer structure, the spacer layer and the cap layer having first and second side surfaces which form said first and second side surfaces respectively of the sensor;
first and second hard bias layers that interface said first and second side surfaces of the sensor;
a top portion of the first side surface having a first notch and a top portion of the second side surface having a second notch;
the first and second notches being sized to enable a reduction of a magnetoresistive coefficient of first and second side portions of the sensor beyond a track width of the sensor;
said first and second notches being at least partially formed by first and second side surfaces of the cap layer being recessed from first and second side surfaces of a remainder of the spin valve sensor so as to expose first and second top surfaces of one of the free, spacer and pinned layers;

nonmagnetic electrically conductive first and second lead layers overlaying the first and second hard bias layers respectively, disposed in the first and second notches respectively, interfacing the first and second top surfaces respectively of one of said free, spacer and pinned layers and being spaced apart by a distance that defines the track width of the read head;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

9. A magnetic disk drive as claimed in claim 8 including:
the free layer structure being located between and interfacing the spacer and cap layers; and
the pinned layer structure being located between and interfacing the spacer layer and the pinning layer.

10. A magnetic disk drive as claimed in claim 9 including:
said first and second notches being formed by the first and second side surfaces of the cap layer being recessed relative to the first and second side surfaces respectively of the free layer structure, the spacer layer, the pinned layer structure and the pinning layer so as to expose first and second top surface portions of the free layer structure; and
first and second ferromagnetic refill layers disposed in the first and second notches respectively and interfacing the first and second top surface portions respectively of the free layer structure with the first ferromagnetic refill layer also being located between the first hard bias layer and the first lead layer and the second ferromagnetic refill layer also being located between the second hard bias layer and the second lead layer.

11. A method of making a magnetic read head which has an air bearing surface (ABS), comprising:
forming a spin valve sensor that has a top surface, a bottom surface and first and second side surfaces which intersect the ABS;
making the spin valve sensor including the steps of:
forming a ferromagnetic pinned layer structure that has a magnetic moment;
forming a pinning layer exchange coupled to the pinned layer structure for pinning the magnetic moment of the pinned layer structure;
forming a ferromagnetic free layer structure that has a magnetic moment that is free to rotate in response to a field signal;
forming a nonmagnetic electrically conductive spacer layer between the free layer structure and the pinned layer structure;
forming a cap layer which forms a top surface of the sensor; and
forming each of the pinned layer structure, the pinning layer structure, the free layer structure, the spacer layer and the cap layer with first and second side surfaces which form said first and second side surfaces respectively of the sensor;
forming first and second hard bias layers interfacing said first and second side surfaces of the sensor;
forming a top portion of the first side surface with a first notch and a top portion of the second side surface with a second notch with the first and second notches being sized to enable a reduction of a magnetoresistive coefficient of first and second side portions of the sensor beyond a track width of the sensor;
said first and second notches being at least partially formed by first and second side surfaces of the cap layer being recessed from first and second side surfaces of a remainder of the spin valve sensor so as to expose first and second top surfaces of one of the free, spacer and pinned layers; and
forming nonmagnetic electrically conductive first and second lead layers overlaying the first and second hard bias layers respectively, disposed in the first and second notches respectively, interfacing the first and second top surfaces respectively of one of said free, spacer and pinned layers and spaced apart by a distance that defines a track width of the read head.

12. A method as claimed in claim 11 including the steps of:
forming nonmagnetic electrically nonconductive first and second read gap layers;
forming the spin valve sensor being between the first and second read gap layers;
forming ferromagnetic first and second shield layers; and
forming the first and second read gap layers between the first and second shield layers.

13. A method as claimed in claim 12 including the steps of:
forming the free layer structure between and interfacing the spacer and cap layers; and
forming the pinned layer structure between and interfacing the spacer layer and the pinning layer.

14. A method as claimed in claim 13 including the steps of:
said first and second notches being formed by forming first and second side surfaces of the cap layer recessed relative to the first and second side surfaces respectively of the free layer structure, the spacer layer, the pinned layer structure and the pinning layer so as to expose first and second top surface portions of the free layer structure; and
forming first and second ferromagnetic refill layers in the first and second notches respectively and interfacing the first and second top surface portions respectively of the free layer structure with the first ferromagnetic refill layer also being located between the first hard bias layer and the first lead layer and the second ferromagnetic refill layer also being located between the second hard bias layer and the second lead layer.

15. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region;

making a read head including the steps of:

forming nonmagnetic electrically nonconductive first and second read gap layers;

forming a spin valve sensor between the first and second read gap layers;

forming the first and second read gap layers between the first shield layer and the first pole piece layer; and forming the spin valve sensor with a top surface, a bottom surface and first and second side surfaces which intersect the ABS;

making the spin valve sensor including the steps of:

forming a ferromagnetic pinned layer structure that has a magnetic moment;

forming a pinning layer exchange coupled to the pinned layer structure for pinning the magnetic moment of the pinned layer structure;

forming a ferromagnetic free layer structure that has a magnetic moment that is free to rotate in response to a field signal;

forming a nonmagnetic electrically conductive spacer layer between the free layer structure and the pinned layer structure;

forming a cap layer which has a top surface of the sensor; and forming each of the pinned layer structure, the pinning layer structure, the free layer structure, the spacer layer and the cap layer having first and second side surfaces which, in turn, form said first and second side surfaces respectively of the sensor;

forming first and second hard bias layers interfacing said first and second side surfaces of the sensor;

forming a top portion of the first side surface with a first notch and a top portion of the second side surface with a second notch with the first and second notches being sized to enable a reduction of a magnetoresistive coefficient of first and second side portions of the sensor beyond a track width of the sensor;

said first and second notches being at least partially formed by first and second side surfaces of the cap layer being recessed from first and second side surfaces of a remainder of the spin valve sensor so as to expose first and second top surfaces of one of the free, spacer and pinned layers; and forming nonmagnetic electrically conductive first and second lead layers overlaying the first and second hard bias layers respectively, disposed in the first and second notches respectively, interfacing the first and second top surfaces respectively of one of said free, spacer and pinned layers and spaced apart by a distance that defines the track width of the read head.

16. A method as claimed in claim 15 including the steps of:

forming the free layer structure between and interfacing the spacer and cap layers; and forming the pinned layer structure between and interfacing the spacer layer and the pinning layer.

17. A method as claimed in claim 16 including the steps of:

said first and second notches being formed by forming first and second side surfaces of the cap layer recessed relative to the first and second side surfaces respectively of the free layer structure, the spacer layer, the pinned layer structure and the pinning layer so as to expose first and second top surface portions of the free layer structure; and forming first and second ferromagnetic refill layers in the first and second notches respectively and interfacing the first and second top surface portions respectively of the free layer structure with the first ferromagnetic refill layer also being located between the first hard bias layer and the first lead layer and the second ferromagnetic refill layer also being located between the second hard bias layer and the second lead layer.

* * * * *